United States Patent
Mons et al.

(10) Patent No.: US 6,621,786 B2
(45) Date of Patent: Sep. 16, 2003

(54) MULTILAYER RECORD CARRIER AND DEVICE FOR SCANNING SAID CARRIER

(75) Inventors: Johannes J. Mons, Eindhoven (NL); Hendrik Bodt, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/083,330

(22) Filed: Oct. 22, 2001

(65) Prior Publication Data

US 2002/0101811 A1 Aug. 1, 2002

Related U.S. Application Data

(63) Continuation of application No. 08/573,850, filed on Dec. 18, 1995, now Pat. No. 6,370,102.

(30) Foreign Application Priority Data

Dec. 19, 1994 (EP) ............................................. 94203677
Sep. 14, 1995 (EP) ............................................. 95202491

(51) Int. Cl.[7] ............................................. G11B 7/24
(52) U.S. Cl. ............................................ 369/94; 369/275.3
(58) Field of Search ........................ 369/275.3, 275.4, 369/94, 44.27, 44.26, 53.2, 283, 286, 30.04, 30.08, 30.07, 30.09, 30.12, 30.1

(56) References Cited

U.S. PATENT DOCUMENTS

| | | | |
|---|---|---|---|
| 3,855,426 A | 12/1974 | Bouwhuis | 179/100.3 |
| 4,450,553 A | 5/1984 | Holster et al. | 369/94 |
| 4,905,215 A | 2/1990 | Hattori et al. | 369/13 |
| 5,218,599 A | 6/1993 | Tsuyoshi et al. | |
| 5,267,226 A | 11/1993 | Matsuoka et al. | 335/454 |
| 5,428,597 A | * 6/1995 | Satoh et al. | 369/275.3 |
| 5,485,452 A | 1/1996 | Maeda | 369/286 |
| 5,586,107 A | 12/1996 | Best et al. | 369/275 |
| 5,608,715 A | 3/1997 | Yokogawa et al. | 369/94 |

FOREIGN PATENT DOCUMENTS

| EP | 0426409 A3 | 5/1991 |
|---|---|---|
| EP | 0426409 A2 | 5/1991 |

* cited by examiner

Primary Examiner—Thang V. Tran
(74) Attorney, Agent, or Firm—Michael E. Belk

(57) ABSTRACT

A record carrier provided with at least two parallel information layers suitable to be scanned by means of a single scanning head is described. Each information layer is provided with a control block in which information is stored which can be used for reading the user information stored in this information layer. The control blocks are placed in the record carrier in such a way that they can be sequentially read by means of a scanning device, with a minimum displacement of the scanning head. The user information may be stored in a first format in the first information layer, and the same user information may be stored in a second format in a second information layer. The first format may be a low-density structure and the second format may be a high-density structure.

5 Claims, 2 Drawing Sheets

MULTILAYER RECORD CARRIER AND DEVICE FOR SCANNING SAID CARRIER

This application is a continuation of application Ser. No. 08/573,850, filed on Dec. 18, 1995, now U.S. Pat. No. 6,370,102.

BACKGROUND OF THE INVENTION

The invention relates to a record carrier suitable to be scanned by means of a single scanning head and provided with at least two substantially parallel information layers. Each information layer may comprise information independently of the information contents of other information layers. The information layers may coincide or be separated from each other by a spacer layer. The invention also relates to a scanning device for scanning such a record carrier. During scanning, information can be written, read or erased.

A record carrier of the type described above is known from U.S. Pat. No. 3,855,426. The known record carrier comprises two or more information layers which are separated by spacer layers. An optical scanning device provided with a single scanning head can read one of the information layers by scanning the layer by means of a focused radiation beam from the scanning head. A subjacent or superjacent information layer can be read by means of the same radiation beam by displacing the focus of the radiation beam in a direction perpendicular to the information layer and by positioning it on the desired layer. Due to this mode of serial reading, the collection of information layers in the record carrier can be regarded as a single uninterrupted information area. This is in contrast to a multilayer record carrier which has a scanning head for each information layer. The information areas of the information layers are then read in parallel and should be regarded as separate areas.

There is a need for a multilayer record carrier suitable to be scanned by means of a single scanning head and provided with control information, i.e. information which can be used for reading and/or writing user information in the record carrier. The control information may comprise general data about user information, such as the name of manufacturer of the record carrier, the author of the stored user information, data about encryption, maximum radiation power during writing, reading and/or erasing, and reallocation tables. The control information may also comprise a table of contents indicating the locations in an information area where given parts of the information are stored.

SUMMARY OF THE INVENTION

It is an object of the invention to provide a multilayer record carrier which is provided with control information.

In accordance with a first aspect of the invention, the record carrier according to the invention is characterized in that each layer comprises a block of control information having information for scanning said layer.

It is known from the standard for the single-layer record carrier Compact Disc, document IEC 908 to place a block of control information at the start of the information area. When the block of control information is placed on the multilayer record carrier in a similar manner, this will lead to one block of control information at the start of the information area. Consequently, a relatively large block of control information comprising data about all information layers is present at the start of the first information layer. Since the size of the block is dependent on the quantity of stored information, and hence on the number of information layers, the size of the block will also increase as the number of information layers increases. Consequently, the space available for user information on the first information layer will decrease. When information is written in the record carrier, it can thus no longer be assumed that an area per information layer having a given minimum size is available for user information. This is a drawback when planning the way in which the information to be written should be distributed on the different information layers.

The record carrier according to the invention obviates this drawback by providing each information layer with a block of control information having data relating to said layer. For a larger number of information layers, the area of each layer available for user information may remain equal.

A particular embodiment of the record carrier according to the invention is characterized in that the blocks substantially have the same physical location in the plane of the different layers. Consecutive blocks of the information layers can quickly be read one after the other by moving the scanning head to the next information layer over a relatively small distance in a direction perpendicular to the information layers without having to move the scanning head over a relatively large distance in the plane of the information layer.

To be able to scan the user information in the consecutive layers rapidly one after the other, a special embodiment of the record carrier according to the invention is characterized in that user information in one of the layers is sequentially ordered in a given direction in the layer, and in that the user information in another layer is sequentially ordered in the opposite direction. In a disc-shaped record carrier, the user information in a given, first information layer is then recorded, for example from the inner edge to the outer edge and in the next, second information layer from the outer edge to the inner edge. After the information in the first layer has been read, the scanning head only needs to be moved over a relatively small distance to the second information layer so as to read the information in this layer. If the block of control information for the second layer were placed at the customary position, i.e. at the start of the information, then the block would be located at the outer edge of the second information layer, hence not proximate to the block of the first layer. For reading the two blocks one after the other, a relatively large displacement in the plane of the layer would then be required. According to the invention, the block for the second information layer is preferably at the inner edge of the information layer, below or above the block of the first layer. Rapid accessibility of the control information of the different information layers can then be realised.

At least one of the blocks of user information preferably has an indication about the number of information layers in the record carrier. With this information, which is not related to a specific information layer, the scanning device can determine on which information layer the focus spot is positioned.

In a special embodiment of the record carrier according to the invention, at least one of the blocks comprises a sub-block having a global indication about user information stored in the layers. With this information it can be determined in which information layer the information to be read is stored, whereafter the block with the control information on this layer can be read so as to determine the position of the information on the indicated layer.

The invention also relates to a scanning device for scanning a record carrier according to the invention. According to the invention, this device is provided with means for sequentially reading the blocks of control information before reading the user information. After the blocks have been read, information is available for scanning all information layers in the record carrier. For example, the location of all parts of information stored on the record carrier will be known from the tables of contents and the user information to be read can be searched without further reading control information in the blocks.

A second aspect of the invention relates to the distribution of user information on the different information layers. In accordance with this aspect, the record carrier is provided with at least two substantially parallel information layers, in which a first information layer comprises user information in a first format and a second information layer comprises the same user information in a second format. The first format may be a low-density structure and the second format may be a high-density structure. This provides the possibility of reading the same user information by means of different types of playback devices, with each playback device being suitable for playing back one of the formats. In an embodiment of the record carrier according to the invention, this distribution of the user information is combined with the distribution of the user information on the information layers in accordance with the first aspect of the invention. It can thereby be avoided that a relatively large part of an information layer having a low-density structure is occupied by control information related to other information layers.

BRIEF DESCRIPTION OF THE DRAWING

These and other aspects of the invention will be apparent from and elucidated with reference to the embodiment described hereinafter in conjunction with the drawings, in which.

In the drawings.

DESCRIPTION OF THE PREFERRED EMBODIMENTS

Figure 1:
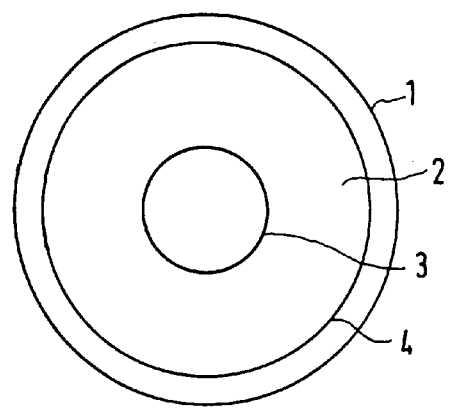
FIG. 1 shows a record carrier having two information layers according to the invention.

FIG. 1 shows a disc-shaped record carrier 1. The elevational view shows one of the information layers of the record carrier, with an information area 2 bounded by a circular inner edge 3 and a circular outer edge 4. The information can be stored in, for example circular or spiral tracks in the information layer, in which the information is sequentially ordered from the inner edge to the outer edge of the information area, or conversely. The information may be divided, for example into sectors in which the ordinal number of the sectors increases from the inner edge to the outer edge.

Figure 2:
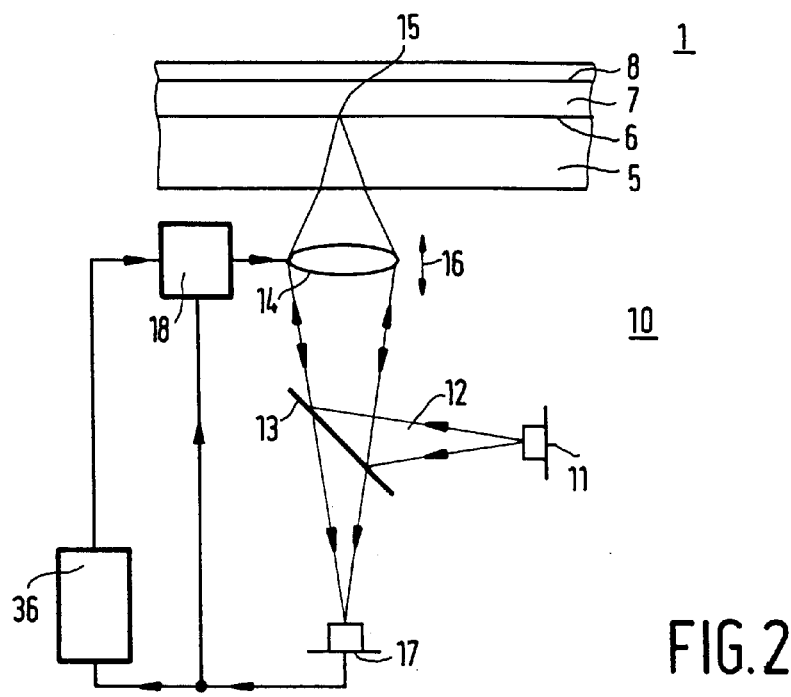
FIG. 2 shows a record carrier and a scanning device.

FIG. 2 is a cross-section of the record carrier 1 and a scanning head of a scanning device 10 for optically scanning the information stored in the record carrier. The record carrier 1 has a transparent substrate 5 provided with a first information layer 6 and a second information layer 8 parallel thereto, separated by a transparent spacer layer 7. Although only two information layers are shown in this embodiment of the record carrier, the number of information layers may be more than two. The spacer layer may be omitted so that the first and second information layers coincide. By storing the information in the first and second layers in a different manner in this case, the information in the first and second layers can be distinguished during reading. The information in the first layer may be stored, for example in a phase structure, while the information in the second information layer is stored in a magnetization structure. It is also possible to store the two types of information in areas which must be read at different wavelengths.

The scanning device 10 comprises a radiation source 11, for example a diode laser which generates a radiation beam 12. The radiation beam is formed to a focusing spot 15 via a beam splitter 13, for example a semitransparent plate, and a lens system 14, for example an objective lens. The focusing spot can be placed on any desired information layer by moving the objective lens 14 along its optical axis, as is denoted by the arrow 16. Since the first information layer 6 is partially transmissive, the radiation beam can be focused through this layer on the second information layer 8. By rotating the record carrier 1 about its centre and by displacing the focusing spot in a direction perpendicular to the tracks in the plane of the information layer, the entire information area 2 of an information layer can be scanned by the focusing spot. The radiation reflected by an information layer is modulated by the stored information into, for example intensity or direction of polarization. The reflected radiation is guided by the objective lens 14 and the beam splitter 13 towards a detection system 17 which converts the incident radiation into one or more electric signals. One of the signals, the information signal, has a modulation which is related to the modulation of the reflected radiation, so that this signal represents the information which has been read. Other electric signals indicate the position of the focusing spot 15 with respect to the track to be read. The latter signals are applied to a servosystem 18 which controls the position of the objective lens 14 and hence the position of the focusing spot 15 in the plane of the information layers and perpendicularly thereto in such a way that the focusing spot follows the desired track in the plane of an information layer to be scanned.

Figure 3:
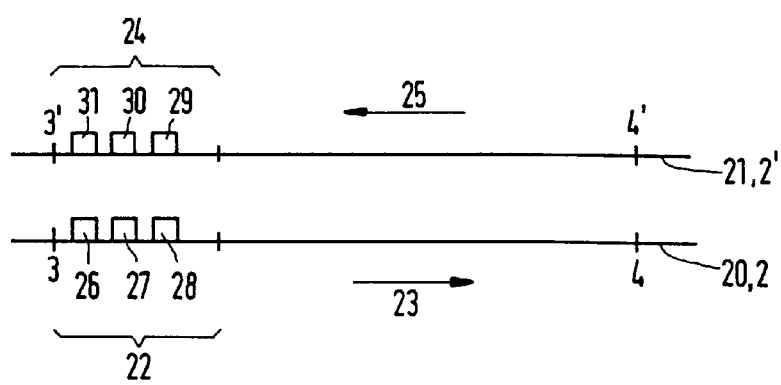
FIG. 3 shows information areas of two superjacent information layers.

FIG. 3 shows diagrammatically the information area 2 of the information layer 6 in the form of a straight line 20 which extends from the inner edge 3 to the outer edge 4. The line 21 shown above it represents the information area 2' of the information layer 8, extending from an inner edge 3' to an outer edge 4'. Superjacent parts of the lines 20 and 21 are also superjacent in the record carrier 1. At the start of information area 2, i.e. the side of the inner edge 3 of line 20, a control area 22 is reserved for storage of control information. The user information is stored in the area located between the control area 22 and the outer edge 4. The direction in which the user information is stored is denoted by the arrow 23. According to the invention, a control area 24 located above the control area 22 is also reserved in the information area 2'. The user information is stored in the area between the outer edge 4' and the control area 24, the information being sequentially ordered in a direction denoted by an arrow 25 which has a direction opposite to that denoted by arrow 23. The opposite direction of ordering can be realised by providing the information layer 6 with a spiral, outwardly extending track and by providing the information layer 8 with a spiral, inwardly extending track. The user information can then be read by scanning the information area 2 of the information layer 6 from the inner edge 3 to the outer edge 4, displacing the focusing spot from the information layer 6 to the information layer 8, and scanning the information area 2' from the outer edge 4' to the inner edge 3'. The information, ordered in the opposite direction, in the information layers 6 and 8 can be read rapidly one after the other because the focusing spot can be displaced reasonably rapidly from the one to the other information layer in comparison with a displacement of the focusing spot from the outer edge of one information layer to the inner edge of another information layer. In the latter displacement, the time required to change the rotational speed of the record carrier, if this record carrier is of the constant linear velocity type, should also be taken into account.

The control area 22 comprises various blocks with control information, also referred to as control blocks, each having the same contents. Three of such blocks 26, 27, 28 are shown in the embodiment of FIG. 3. The block is stored three times so as to be able to read the contents in one of the two other blocks if the contents of a block are unreadable because it contains more errors than can be restored by means of a possibly present error-correcting circuit and an error-correcting code stored on the record carrier. The control area 24, located according to the invention above the control area 22, also comprises three control blocks 29, 30 and 31 with control information for the information layer 8, the information within a block being sequentially ordered in the direction of the arrow 25.

Figure 4:
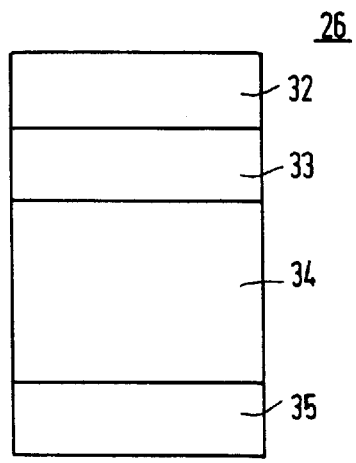
FIG. 4 shows a division of a control block.
Figure 5:
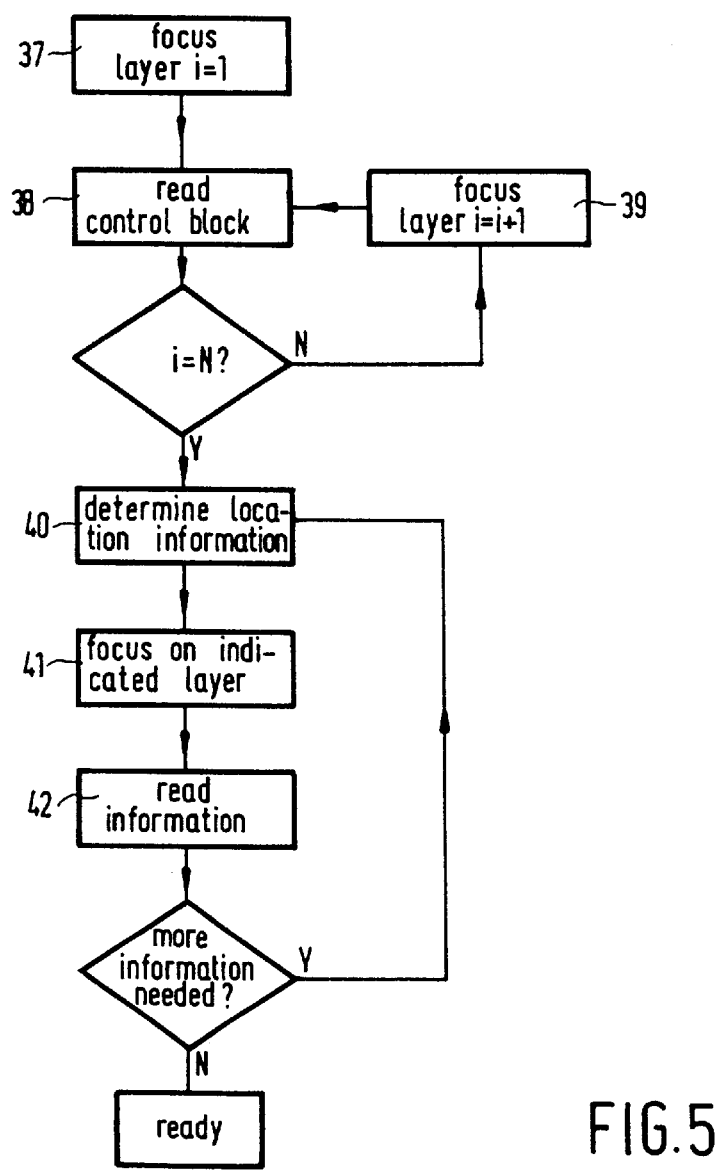
FIG. 5 shows a flow chart for reading a record carrier.

FIG. 4 diagrammatically shows the division of the control block 26 for the first information layer 6. The block 26 comprises a first sub-block 32 with information about the record carrier as a whole. The information may comprise a type indication of the record carrier, an indication of the number of information layers and the number of blocks of user information in the record carrier, parameters for the radiation beam for writing and reading, information about encryption of the stored information, a table of contents with a global indication of the user information stored in each layer, data relating to a group of record carriers of which this record carrier forms part, and indications of the publisher and manufacturer.

A second sub-block 33 of the control block 26 comprises information about the information layer on which this block is written. It has, inter alia an indication of the ordinal number of the layer, the number of blocks with user information on the layer and an indication of the type of user information.

A third sub-block 34 of the control block 26 comprises a table of contents of the information layer on which the control block has been written. The table of contents indicates the initial and final address of each block of associated user information, a short indication of the user information in each block or an address having such an indication.

A fourth sub-block 35 of the control block 26 comprises a reallocation table in which reference addresses are mentioned for unwritable and unreadable sectors in the information layer. The fourth sub-block is only necessary on writable media. The control block 26 on the first information layer 6 comprises all of said sub-blocks, while the control blocks on other information layers comprise the second, third and possibly fourth sub-blocks. The other information layers may also comprise a first sub-block.

The scanning device 10 shown in FIG. 2 is suitable for sequentially reading the blocks of control information before reading the user information. To this end the scanning device comprises means for causing the focusing spot to follow a track, for example in the form of the above-mentioned servosystems, and to displace the focusing spot from one to the other information layer. The last-mentioned displacement of the focusing spot can be realised by means of the servosystem which retains the focusing spot on an information layer.

The means also comprise a control unit 36 which controls, inter alia the servosystem 18. The control unit operates in accordance with a control program which controls the scanning device in such a way that after correct reading of a control block in the information layer 6 the user information in this layer is not read first, but the focusing spot is displaced towards the information layer 8 in which it reads a control block for this layer. The flow chart of such a control program is shown in FIG. 4 for reading blocks of user information on a record carrier according to the invention. In a first step 37, the focusing spot 15 is placed on the first information layer 6 via the servosystem 18. In a second step 38, the information in the control block 26 on this layer is read. The information comprises the total number of layers N and the ordinal number i of the instantaneously read layer. If i≠N, i.e. all layers have not been read yet, the focusing spot is placed in step 39 on the next information layer and the associated control block is read. If i=N, all control information has been read. With reference to the information in all control blocks which have been read, it is determined in step 40 which information layer comprises the first block of user information to be read. In step 41, the focusing spot is placed on the relevant information layer and in step 42 it is placed on the location of the block of user information in this layer, whereafter the information in the block is read. If more blocks with user information must be read, the control program returns to step 40 so as to determine the location of the next block from the control information which has already been read.

The control program may also be used for writing and erasing information in the record carrier. During writing it is determined in step 40 where and on which information layer the block of user information can be written. When subsequently sectors have to be reallocated during writing in said area due to defects in the record carrier, the relevant addresses can be noted in the reallocation table of the control block of the written layer. During erasing, it is determined in step 40 where and on which layer the information to be erased has been written, whereafter the relevant area is erased.

In many scanning devices, the focusing spot is displaced in the radial direction of the record carrier by means of a two-stage displacement system which forms part of the servosystem 18. The first stage is a relatively slow and large displacement of a slide, the second stage is a relatively small and rapid displacement of the objective lens 14 in the radial direction. For rapid reading of a control block, the radial dimension of a block and preferably the control area is smaller than the maximum radial displacement of the focusing spot 15 caused by the objective lens. This maximum displacement is usually of the order of 100 µm. At a given radius of the control area, the distance between the tracks and information density in the tracks of the record carrier 1, this yields a content of approximately 1 megabyte per control block. If the control information of all information layers should be stored in a single block of 1 megabyte on the information layer 6, it will be evident that space problems are produced in the block when a large number of layers is used. The invention solves this problem by placing the control information associated with an information layer in a block on the information layer itself. The division of other information layers and hence the size of the area for user information can now be independent of the number of information layers.

The record carrier as shown in FIG. 2 is suitable for storing information in two different formats. The term 'format' comprises the organization structure of the information, its coding and the physical mode of storage. User information, for example in the form of a piece of music coded in accordance with the 16-bit Compact Disc Digital Audio standard may be stored on the first information layer 6. The same piece of music then, however, coded for a higher sound quality in accordance with, for example a 24-bit code may be stored on the second information layer 8. The information in the second information layer may be stored in a structure of, for example pits having a higher density than the information in the first information layer, so that both pieces of music physically occupy an equal quantity of space. It is now possible to read the record carrier by means of a Compact Disc player which scans the first information layer, and by means of a high-density player which scans the second information layer and then generates a higher quality of music than the Compact Disc player. The record carrier is thus compatible for the Compact Disc player and the high-density player. If the space in the second information layer is sufficiently large, the user information can be stored in different formats in this information layer, for example, in a 24-bit code and in the multichannel audio format known in the world of cinema. Dependent on the playback devices which are present and available, a choice can then be made between the different formats in which the information is stored. Another possibility is to store a film having one or more sound tracks in the second information layer and further information layers, if any, and to store one of the sound tracks, for example with music of the film, in the first information layer. It will then be possible to play back the film on a video player and to play back the music of this film on an audio player.

It will be evident that said mode of storing information is not limited to record carriers in which control blocks are provided in the manner described hereinbefore, and is neither limited to record carriers which are only suitable to be read by means of a single scanning head.

It will also be evident that the use of the invention is not limited to disc-shaped record carriers but is also suitable for, for example rectangular record carriers such as memory cards. Although the invention has been explained with reference to an optical record carrier, it will be evident that the invention may alternatively be used for any type of multilayer record carrier which can be read by means of a single scanning head.

What is claimed is:

1. A record carrier for scanning by an optical head, comprising:

multiple at least partially co-extending and substantially parallel information layers;

each layer of multiple layers includes a user area formatted for user information and a control area formatted for layer control information relevant only for scanning the user information of the respective layer and contained only in the respective layer;

the control area of at least one of the layers and less than all the layers being formatted for global control information relevant for scanning the information of other information layers, the global control information including a table of contents for determining in which layer particular user information is stored and the layer control information including a table of contents for determining the address of the particular user information in the layer within which the particular information is stored.

2. The record carrier of claim 1, in which the global control information includes information indicating the number of layers.

3. The record carrier of claim 1, in which the global control information includes information about the contents of the user information in another layer.

4. The record carrier of claim 1 in which the global control information includes information for controlling a lens to remain in focus during scanning of a track of another information layer which is to be read, such control being effected by a servo-system based on the global control information.

5. The record carrier of claim 1 further comprising means for minimizing an access time to read all the first information from the respective layers including:

each layer of multiple layers contains one area of control information formatted for containing all the layer control information;

the one area of control information formatted for layer control information of each layer co-extends with the area for layer control information contained in all the other layers;

the global control information is only contained in the one layer and includes control information for scanning the user information of all the layers; and tracks of information in one of the layers is sequentially ordered in one direction and the tracks of information in a layer adjacent to the one layer is sequentially ordered in the opposite direction.

* * * * *